April 16, 1929. J. SCHULTZ Re. 17,275
INKING SURFACE CLEANSING APPLIANCE
Original Filed Nov. 17, 1926 2 Sheets-Sheet 1
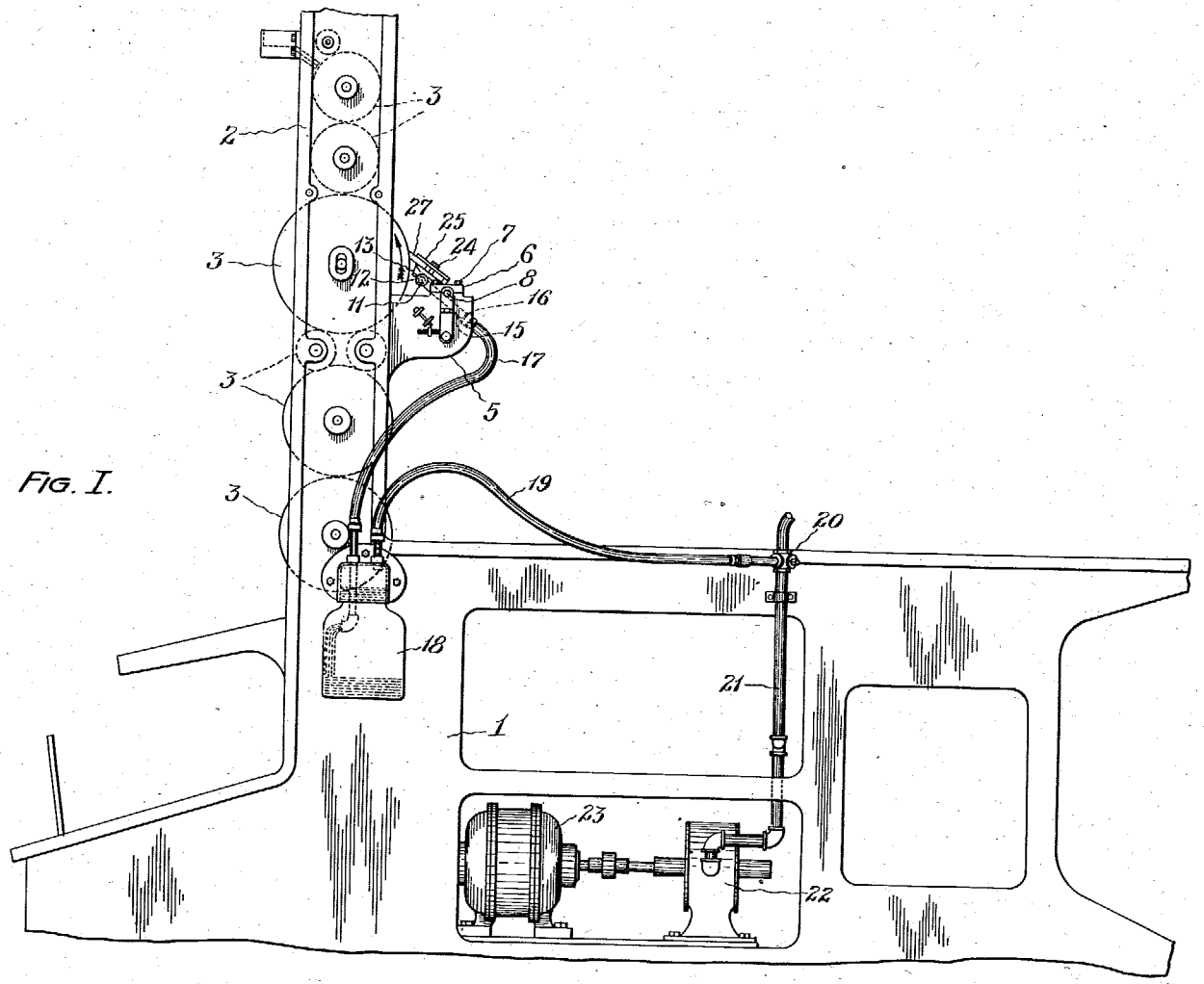
FIG. I.
INVENTOR:
JOSEPH SCHULTZ
by his atty. Ernest B. Gilbert J. SCHULTZ
INKING SURFACE CLEANSING APPLIANCE
April 16, 1929.
Re. 17,275
2 Sheets-Sheet 2
Original Filed Nov. 17, 1926
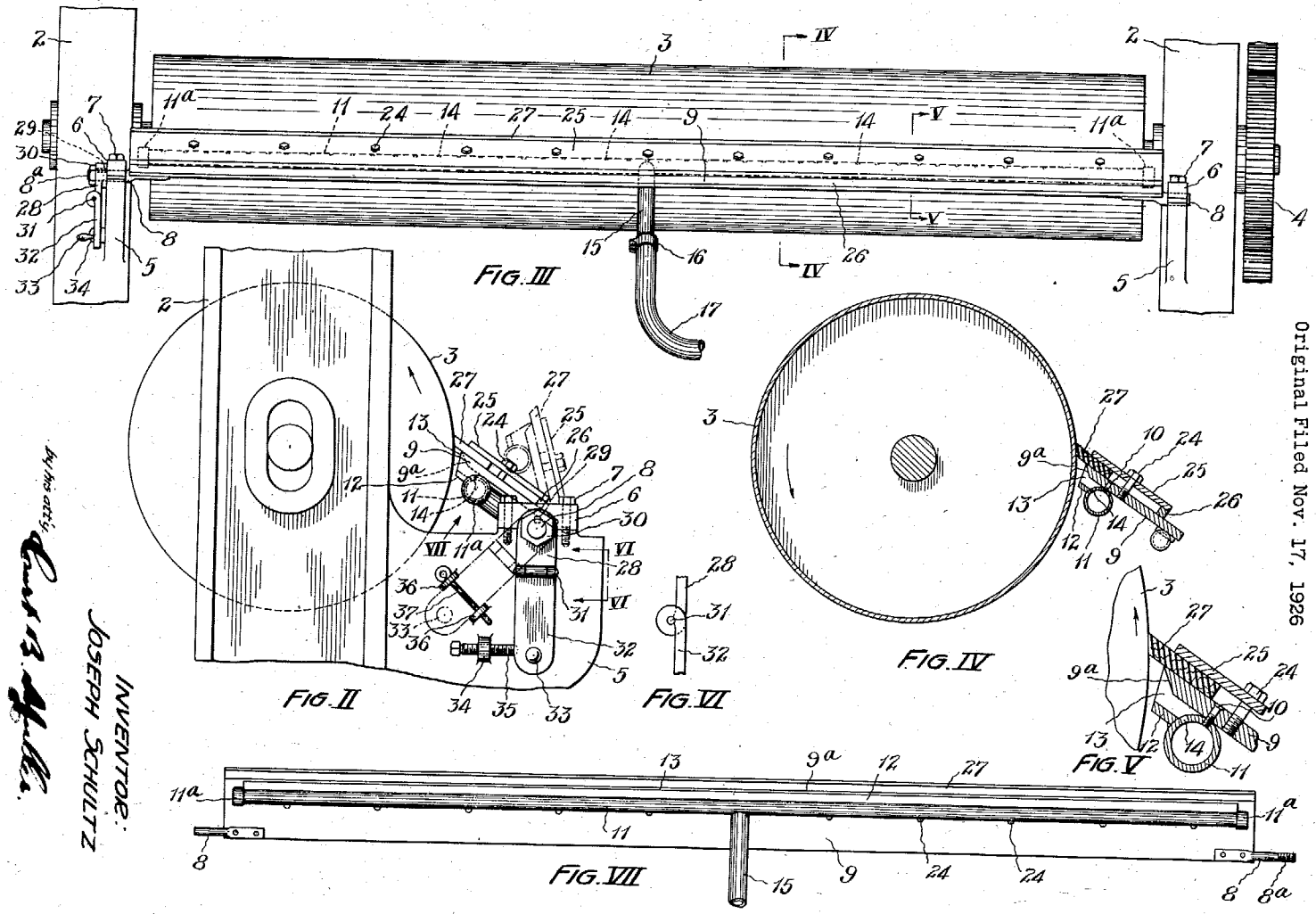
INVENTOR:
JOSEPH SCHULTZ
by his att'y Reissued Apr. 16, 1929. Re. 17,275

UNITED STATES PATENT OFFICE.

JOSEPH SCHULTZ, OF CLEVELAND, OHIO.

INKING-SURFACE-CLEANSING APPLIANCE.

Original No. 1,700,518, dated January 29, 1929, Serial No. 148,940, filed November 17, 1926. Application for reissue filed March 2, 1929. Serial No. 344,058.

My invention pertains to an inking surface cleansing appliance and more particularly to mechanism for cleaning the surfaces on which ink is spread in printing presses, which is called in the art a "wash-up" procedure.

The disclosures herein present a development of the underlying principles shown, described and claimed in my co-pending application filed August 2, 1926, Serial No. 126,491, and constitute in certain respects improvements over the disclosures of that earlier application.

The object of my invention is primarily to facilitate the "wash-up" of a printing press preparatory to running thereon a different job, frequently using a different color of ink, and also to perform this operation in very much less time.

A yielding wiper is employed which will permit of printing even while the wiper is in contact with an ink carrying surface or until the ink has been thinned by a diluting vehicle, benzine for instance. This possibility presents the advantage of permitting the "wash-up" of one-half of the press at a time, while the friction still existing on the other half continues to transfer power from one roller to another, it being preferable not to have any inking roller "stall", i. e., slide, which would occasion a back wash and spilling of benzine over other parts of the press. After use of my appliance the inking surfaces are left absolutely clean and dry so that the press can again be "inked-up" immediately after the "wash-up" because even the pores of the rollers have been cleansed and no film of benzine remains to interfere with the depositing of the new ink. According to my present exemplifying disclosures a receptacle is optionally provided, into which the dislodged ink will be drawn by suction after being first thinned by the application of the diluting vehicle.

It is to be realized that the scope of my invention comprehends many equivalent constructions and some changes in practicing the method. The showing of the drawings and the particular description are merely a specific exemplification.

Adverting to the drawings:

Figure I is a side elevation of the essential elements of a lithographic printing press showing my appliance attached thereto.

Figure II is an enlarged end elevation of a portion of Figure I showing two portions of the wiping appliance; one the functionating position and the other an inutile position.

Figure III is a plan view of one inking roller and of the wiping structure.

Figure IV is an enlarged cross-sectional view on line IV—IV of Figure III.

Figure V is a still further enlarged fragmentary view on line V—V of Figure III.

Figure VI is a fragmentary view of a hinge element as viewed on line VI—VI of Figure II.

Figure VII is a bottom view of the "wash-up" attachment observed in the direction of the arrow VII in Figure II.

A bed 1 of a press carries upright standards 2, on which are rotatably mounted a series of progressively superimposed inking rollers 3, each in frictional engagement with a plurality of others. In a standard lithographic press such as is illustrated some of the rollers 3 are of metal and some of composition and each receives and transfers rolling movement as well as ink. One of the rollers 3 is to be driven by a gear 4 as appears in Figure III and in a manner common to the art. Projecting from the standards 3, at points somewhat below the axis of the driven roller 3, are brackets 5. The upper surface of these brackets are designed in conjunction with bearing caps 6, detachably secured by means of screws 7, to provide bearings for a pair of studs 8, one of which has a screw threaded extremity $8^a$, and which studs project from opposite ends of a cleansing structure support 9, as appears in Figure VII.

As illustrated in Figure V, a series of screws 10, which are passed downwardly through the support 9, in a row extending crosswise of the press, support a pipe 11 with which is associated a diagonally upward plate 12 forming an inlet passage 13 in conjunction with a portion of the lower side of the support 9 and in conjunction further with a beveled upper end $9^a$ of the latter. The pipe 11 is supplied with a series of equi-spaced openings 14 communicating with the inlet passage 13, as likewise appears in Figure V. The ends of the pipe 11 are closed by caps $11^a$ (see Figure VII) and the middle of the pipe 11 communicates with a pipe 15 the other end of which is clamped at 16 to one end of a flexible tube 17 (see Figures I and III). The tube 17 is connected with a receptacle 18, as is also another tube 19, having a valve connection at 20 with piping 21 leading to a suction fan 22 driven by a motor 23. The connection just described, when the valve 20 is open and the motor 23 in operation, will permit of the establishment of a suction effect therethrough which is effective at the inlet 13, which is opposed in proximity to the periphery of one of the rollers 3.

Screws 24 serve to draw a plate 25 toward the support 9, as may be seen in Figure IV, to clamp therebetween a spacing element 26 and a yielding wiper 27 which may be composed of rubber, as indicated, and which may be adjusted so as frictionally and yieldingly to engage the periphery of the roller 3 just above the inlet 13.

One element 28 of a hinge structure is keyed at 29 to a projecting portion of that stud 8 which is fashioned with a thread 8ª and is held in place by a nut 30. The element 28 is hinged at 31 to an arm 32 which carries a handle 33. To provide a common device for the purpose of effecting and maintaining a slight turning adjustment of the wiper-carrying structure in a direction to increase the pressure of the wiper 27 against the roller 3, one of the brackets 5 carries an ear 34 with which a set screw 35 is in threaded connection so as to be positioned to engage one side of the lower end of the hingedly-carried arm 32. Should it be desired to withdraw the wiping structure from the roller 3, the handle 33 may be grasped and the arm 32 forced beyond the end of the screw 35 (which is possible because of the yielding of the unclamped portion of the wiper 27) and then the arm 32 may be swung upward on its hinge to clear the screw 35, whereupon the entire wiping structure may be swung to its dotted-line position, as shown in Figure II. In such position, the arm 32 may be placed in a fork 36 which is fixed to the bracket 5 and be there locked by the insertion of a pin 37 through registering holes in the fork 36.

The operation of my appliance is as follows:

After the printing press has been supplied with its ink preparatory to running a job, the wiping structure may either be caused to assume its dotted-line position, indicated in Figure II, or even its full line position because practice has demonstrated that without dilution of the viscid ink the wiper 27 will not dislodge the ink coating. When it is desired to cleanse the inking surfaces, the wiper 27 should, of course, contact the periphery of the roller 3 with that degree of pressure which experience will have taught the conditions to prescribe, but so as neither to wear nor excessively to retard the roller 3 which it contacts, after which benzine or some other suitable diluting vehicle is supplied to say, one-half of the crosswise extent of the wiper 27 and the motor 23 set in motion with the valve 20 open. After the ink on one-half of the various rollers has been progressively removed and withdrawn through the inlet 13, orifices 14 and connections to the receptacle 18; the other half may be similarly dried and cleansed.

What I believe to embrace patentable novelty and therefore claim, is:

1. In a printing press, the combination of a bed, a plurality of inking rollers in peripheral contact each with another and adapted frictionally to transfer rotational movement, a structure carried by said bed and including a duct having an inlet opposed to one of said rollers, an obliquely presented wiper carried by said structure directly above said inlet and yieldingly contacting a receding upper semi-cylindrical portion of the periphery of the same one of said rollers with reference to the direction of presentation of said wiper, the arrangement being such that no retardation of the rotational movement of the particular roller occurs while the wiper dislodges ink during a partial wash-up of the press involving the application of a diluting fluid to a portion of the line of contact between said roller and wiper and a suction appliance connected with the other end of said duct.

2. In a lithographic press, the combination of a bed, a plurality of inking rollers in progressively superimposed peripheral contact and each adapted frictionally to receive and to transfer rotational movement and also ink and a rubber wiper adjustably carried by said bed so as to be obliquely presented toward the periphery of one of said rollers, said wiper being arranged and adapted yieldingly to contact relatively receding portions of said periphery of the particular one of said rollers, the arrangement being such that no retardation of the rotational movement of the wiper-contacted roller occurs while the wiper dislodges ink during a partial wash-up of the press involving the application of a diluting fluid to a portion of the line of contact between said roller and wiper.

Signed at Cleveland, Ohio, this 14th day of February, 1929.

JOSEPH SCHULTZ.